United States Patent [19]

Mellwig et al.

[11] Patent Number: 4,765,021
[45] Date of Patent: Aug. 23, 1988

[54] HEAVY DUTY CASTER

[75] Inventors: Dieter Mellwig, Wermelskirchen; Wilfried Kurbjuhn, Radevormwald, both of Fed. Rep. of Germany

[73] Assignee: Albert Schulte Söhne GmbH. & Co., Wermelskirchen, Fed. Rep. of Germany

[21] Appl. No.: 942,165

[22] Filed: Dec. 16, 1986

[30] Foreign Application Priority Data

Dec. 20, 1985 [DE] Fed. Rep. of Germany ....... 3545161

[51] Int. Cl.$^4$ ............................................. B60B 33/00
[52] U.S. Cl. .......................................... 16/20; 16/36; 16/48
[58] Field of Search .................... 16/20, 36, 18 R, 48, 16/DIG. 27, 31 R; 384/275, DIG. 908, DIG. 912

[56] References Cited

U.S. PATENT DOCUMENTS 3,837,039  9/1974  Rehrig ..................................... 16/20

FOREIGN PATENT DOCUMENTS 1575525   3/1972  Fed. Rep. of Germany .
2217520  11/1973  Fed. Rep. of Germany .......... 16/20

OTHER PUBLICATIONS

Rhombus Roller 1977 Catalog, pp. 77, 121 and 124.

Primary Examiner—Nicholas P. Godici
Assistant Examiner—Carmine Cuda
Attorney, Agent, or Firm—Peter K. Kontler

[57] ABSTRACT

A heavy duty caster for use on machines, heavy conveyances and the like has a plate the underside of which has a circular socket for a disc-shaped first thrust bearing element which is rotatably held in the socket against appreciable axial movement by a ring-shaped second bearing element bolted to the support. The first bearing element is integral with a downwardly extending shank which is bolted to the web of the inverted U-shaped frame for the wheel or wheels of the caster. A sealing ring is interposed between the ring-shaped bearing and the shank, and the support has a lubricant-admitting hole which communicates with the socket and is normally sealed by a plug.

11 Claims, 1 Drawing Sheet

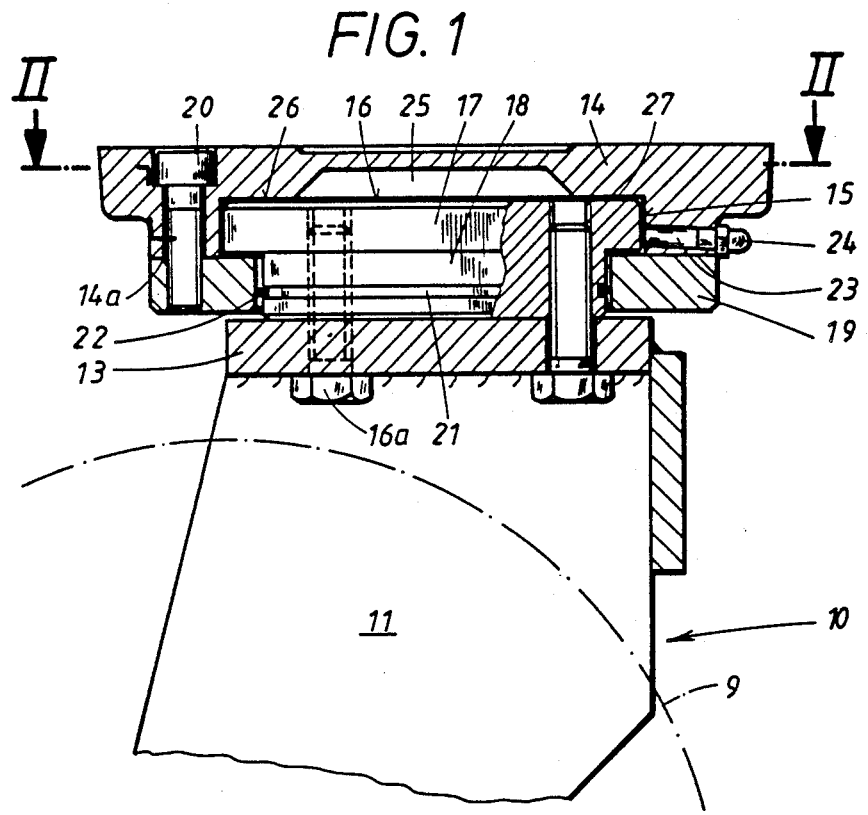
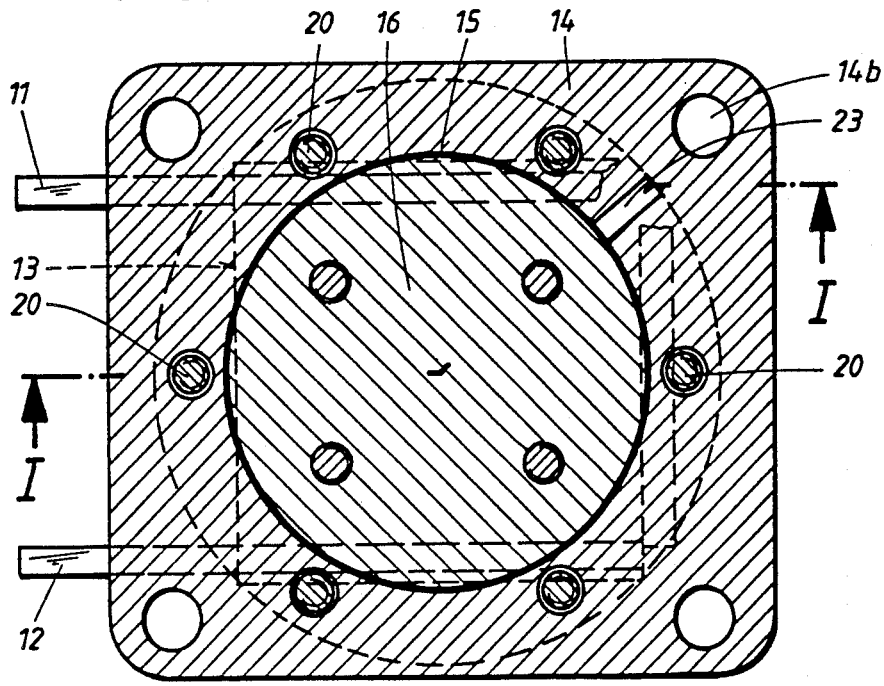

HEAVY DUTY CASTER

BACKGROUND OF THE INVENTION

The invention relates to casters in general, and more particularly to improvements in casters for use on heavy equipment including conveyances, machines, large aggregates and the like. More particularly, the invention relates to improvements in casters wherein a thrust bearing is interposed between the frame for the wheel or wheels of the caster and the support which is secured to or forms part of the base of a machine or the like.

It is known to interpose two ball bearings between the frame for the wheel or wheels of a heavy duty caster and the support which is mounted at the underside of the structure to be mounted on a set of casters. One ball bearing is designed to take up axial stresses and the other ball bearing takes up (primarily or exclusively) radial stresses. It is also known to use a single antifriction bearing with conical rolling elements as a substitute for a twin ball bearing; the conical rolling elements are designed to stand axial stresses but are also capable of taking up some radial stresses to ensure proper guidance of the wheel frame. A drawback of such bearings is that they require frequent adjustment as well as that their initial and installation costs are rather high. Furthermore, only a few spherical or conical antifriction rolling elements are actually called upon to take up stresses because, in most instances, the axis of the wheel is laterally offset from the vertical swivel axis of the caster. This leads to the generation of excessive localized stresses with attendant penetration of rolling elements into the adjacent races or tracks which renders it necessary to exert a substantial force in order to swivel the wheel about its vertical axis.

OBJECTS AND SUMMARY OF THE INVENTION

An object of the invention is to provide a relatively simple, compact and inexpensive heavy duty caster which can stand pronounced radial and/or axial stresses.

Another object of the invention is to provide a novel and improved thrust bearing for use in the above outlined caster.

A further object of the invention is to provide a caster which can be rapidly assembled or taken apart and which can be properly lubricated whenever desired or necessary.

An additional object of the invention is to provide a caster wherein all parts which are sensitive to contamination are confined in a simple and inexpensive but reliable way.

Still another object of the invention is to provide a caster which can be used as a superior substitute for heretofore known heavy duty casters.

The invention is embodied in a caster, particularly a heavy duty caster for use on machines, conveyances, aggregates and the like. The caster comprises a support (e.g., a metallic plate which is mounted at the underside of a conveyance or a machine) having a surface (preferably the underside of the support) which is provided with a socket (particularly a shallow circular socket), and a thrust bearing including a first bearing element having a circular portion (e.g., a flat disc) rotatably received in the socket and a second bearing element which is rigid with the support and has means for rotatably confining the circular portion of the first bearing element in the socket. The caster further comprises a frame for the wheel or wheels, and means (e.g., a set of bolts or the like) for securing the frame to the first bearing element so that the frame and the first bearing element can rotate relative to the support and the second bearing element.

The surface of the support preferably includes a centrally located first section which is remote from the circular portion of the first bearing element, and an annular second section which surrounds the first section and is adjacent the circular portion of the first bearing element. The second bearing element can comprise a ring a portion of which overlies the circular portion of the first bearing element and means (e.g., bolts or other suitable fasteners) for fastening the ring to the support. The aforementioned securing means can comprise a shank which is rigid (e.g., integral) with the circular portion of the first bearing element and extends through the ring (second bearing element) in a direction away from the surface of the support. Such caster can further comprise means for sealing the socket from the surrounding atmosphere, e.g., one or more annular sealing elements which are interposed between the ring and the shank. The shank can be provided with one or more circumferentially extending grooves for portions of the sealing elements.

A layer of friction reducing material (e.g., a foil) can be interposed between the circular portion of the first bearing element and the support and/or second bearing element.

The support can be provided with one or more holes for admission of lubricant into the socket, and the caster can comprise means (e.g., one or more plugs) for sealing such hole or holes.

The novel features which are considered as characteristic of the invention are set forth in particular in the appended claims. The improved caster itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly central vertical sectional view of a heavy duty caster which embodies one form of the present invention; and FIG. 2 is a horizontal sectional view as seen in the direction of arrows from the line II—II of FIG. 1.

DESCRIPTION OF THE PREFERRED EMBODIMENTS

The heavy duty caster which is shown in FIGS. 1 and 2 comprises an inverted U-shaped metallic frame 10 for a wheel 9 (indicated by a phantom line). The frame 10 has two legs 11, 12 which flank the wheel 9 and carry a shaft for the wheel, and a web 13 which is welded to the upper end portions of the legs 11, 12. Alternatively, the frame 10 can constitute a one-piece casting or a one-piece blank which is obtained by bending the legs 11 and 12 relative to the web 13.

The caster further comprises a plate-like support 14 which can be connected to the base of a machine or a heavy conveyance, not shown, by means of bolts whose shanks extend through holes shown at the four corners of the support 14. The underside or bottom surface 14a of the support 14 has a centrally located circular socket 15 in the form of a relatively shallow depression for the circular portion 17 of a first thrust bearing element 16. The means for securing the bearing element 16 to the web 13 of the frame 10 comprises a cylindrical shank 18 which is integral with the bearing element 16 and extends downwardly, i.e., away from the support 14, as well as several (e.g., four) equidistant bolts 16a which fixedly but separably secure the frame 10 to the bearing element 16 by way of the shank 18. The thrust bearing further comprises a ring-shaped second bearing element 19 which overlies the underside of the circular portion 17 and is secured to the support 14 by a set of four equidistant screws 20 or other suitable fasteners. The radially innermost portion of the bearing element 19 holds the circular portion 17 against appreciable axial movement in the socket 15 but permits the circular portion to rotate with reference to the support 14 about a vertical axis which bypasses the axis of the wheel 9, i.e., the axes of the wheel 9 and of the circular portion 17 are not located in a common plane. The axial length (height) of the circular portion 17 matches or approximates the depth of the socket 15 in the bottom surface 14a of the support 14. This support has a centrally located depression 25 bounded by a preferably circular section of the surface 14a, and such section is remote from the upper side of the circular portion 17. The surface 14a further includes an annular section 26 which surrounds the depression 25 and is immediately adjacent the upper side of the marginal zone of the circular portion 17.

The shank 18 is formed with a circumferential groove 21 for a portion of an annular sealing element 22 which seals the socket 15 from the atmosphere. The groove 21 can be replaced by a groove in the internal surface of the radially innermost portion of the ring-shaped bearing element 19. The arrangement is preferably such that the clearance between the shank 18 and the bearing element 19 is small.

The support 14 has one or more holes or bores 23 for admission of lubricant into the socket 15, and the outer end of each such hole can be sealed by a suitable plug 24.

The improved caster preferably further comprises a layer 27 (e.g., a foil) of friction reducing material which is interposed between the circular portion 17 and the surface surrounding the socket 15 and preferably also between the circular portion 17 and the bearing element 19. This layer serves to reduce the likelihood of generation of extensive friction and excessive wear in the absence of lubricant in the socket 15 as well as to enhance the friction-reducing action of the lubricant. The layer 27 can constitute a woven metallic sheet which is coated with a suitable synthetic plastic material such as polytetrafluoroethylene.

An important advantage of the improved caster is its simplicity. Furthermore, the caster is reliable, can stand long periods of pronounced stressing and can be attended to and taken apart with little loss in time. The elements 16, 19 of the thrust bearing are reliably held against excessive radial and/or axial movement, and they can be properly lubricated in a number of different ways. The area of contact between the bearing element 16 and the support 14 can be selected practically at will so as to reduce the likelihood of the development of excessive localized stresses. The provision of depression 25 in the surface 14a at the underside of the support 14 also contributes to more satisfactory and predictable distribution of stresses.

The layer 27 can constitute a separate component or it can be applied directly to the circular portion 17, to the surface surrounding the socket 15 and/or to the bearing element 19. Instead of using a layer 27 in the form of a plastic-coated woven metallic body, it is equally possible to employ a friction reducing layer of bronze, acetal copolymer and/or others.

Another important advantage of the improved caster is that the space requirements of the thrust bearing 9 in the axial direction of the bearing elements 16, 19 are very small. Moreover, the caster requires a minimum of maintenance because the circular portion 17 of the bearing element 16 can be readily lubricated and is adequately sealed from the atmosphere to thus reduce the likelihood of contamination regardless of the nature of use of the machine or conveyance (or other heavy object) which is mounted on the caster.

The circular portion 17 of the bearing element 16 is or can be so thin that it need not extend downwardly beyond the socket 15. This also contributes to compactness of the caster. The elements of the thrust bearing are simple and rugged so that the bearing can stand heavy stresses for long periods of time. Still further, the shank 18 can be connected with any one of a wide variety of bifurcated or otherwise configured wheel frames which contributes to greater versatility of the improved caster. The number of spare parts which must be kept in storage is minimal. The layer or layers 27 ensure adequate lubrication even in the absence of any standard lubricant in the socket 15. Still further, the material of the layer 27 can be selected in such a way that it prevents or delays corrosion of adjacent metallic parts of the caster.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A caster, particularly a heavy duty caster for use on machines, conveyances and the like, comprising a support having a depending rib defining a socket, said rib having a lower end face; a friction thrust bearing including a first bearing element having a larger-diameter circular portion rotatably and snugly received in said socket and a smaller-diameter shank rigid with said circular portion, and an annular second bearing element below said support and surrounding said shank, said second bearing element having a first portion immediately below and overlapping said end face and a second portion immediately below and overlapping said circular portion; means for separably fastening said second bearing element to said support; a wheel frame; and means for securing said frame to said first bearing element.

2. The caster of claim 1, wherein said support has a surface including a first section which is remote from said circular portion and an annular second section which surrounds the first section and is adjacent said circular portion.

3. The caster of claim 1, wherein said shank extends through said second bearing element; and further comprising annular sealing means interposed between said second bearing element and said shank.

4. The caster of claim 3, wherein said shank has a circumferentially extending groove for a portion of said sealing means.

5. The caster of claim 1, further comprising a layer of friction reducing material interposed between said first bearing element and said support.

6. The caster of claim 5, wherein said layer includes a foil.

7. The caster of claim 1, further comprising a layer of friction reducing material interposed between said bearing elements.

8. The caster of claim 7, wherein said layer includes a foil.

9. The caster of claim 1, wherein said support has a lubricant-admitting hole communicating with said socket; and further comprising means for sealing said hole.

10. The caster of claim 1, further comprising means for sealing said socket from the surrounding atmosphere.

11. The caster of claim 1, wherein said socket includes a centrally located circular recess and said support has an annular surface surrounding said recess and abutting said circular portion.

* * * * *